(12) United States Patent
Hogasten et al.

(10) Patent No.: US 8,340,414 B2
(45) Date of Patent: Dec. 25, 2012

(54) METHOD FOR ENHANCING CONTRAST IN INFRARED IMAGES

(75) Inventors: Nicolas Hogasten, Hägersten (SE); Graham McCarthy, Stockholm (SE)

(73) Assignee: Flir Systems AB, Danderyd (SE)

( * ) Notice: Subject to any disclaimer, the term of this patent is extended or adjusted under 35 U.S.C. 154(b) by 578 days.

(21) Appl. No.: 12/525,571

(22) PCT Filed: Jan. 30, 2008

(86) PCT No.: PCT/SE2008/000082
§ 371 (c)(1),
(2), (4) Date: Dec. 18, 2009

(87) PCT Pub. No.: WO2008/094102
PCT Pub. Date: Aug. 7, 2008

(65) Prior Publication Data
US 2010/0111412 A1    May 6, 2010

(30) Foreign Application Priority Data
Feb. 1, 2007  (SE) ..................... 0700240

(51) Int. Cl.
*G06K 9/00* (2006.01)
*G06K 9/40* (2006.01)
(52) U.S. Cl. .................. 382/167; 382/162; 382/274
(58) Field of Classification Search .......... 382/167, 382/274
See application file for complete search history.

(56) References Cited

U.S. PATENT DOCUMENTS

| | | | |
|---|---|---|---|
| 4,999,711 A | 3/1991 | Paulin | |
| 5,249,241 A | 9/1993 | Silverman et al. | |
| 7,463,769 B2 * | 12/2008 | Lin et al. | 382/169 |
| 7,715,651 B2 * | 5/2010 | Padwick et al. | 382/284 |
| 2004/0264804 A1 | 12/2004 | Turner | |
| 2005/0200760 A1 * | 9/2005 | Nakakuki | 348/623 |
| 2006/0132642 A1 * | 6/2006 | Hosaka et al. | 348/370 |

OTHER PUBLICATIONS

Zia Rahman and Glenn A. Woodell "Retinex processing for automatic image enhancement", Journal of Electronic Imaging, 2004, vol. 13, pp. 100-110.*

John R. Schott, Scott D. Brown, Rolando V. Raqueno, Harry N. Gross and Gary Robinson, "Advanced synthetic image generation models and their application to multi/hyperspectral algorithm development", Proc. SPIE 3584, 211 (1999).*

(Continued)

*Primary Examiner* — Bhavesh Mehta
*Assistant Examiner* — Utpal Shah
(74) *Attorney, Agent, or Firm* — Venable LLP; Eric J. Franklin

(57) ABSTRACT

A method for image processing comprising filtration and conversion to a radiometric color image based on an original image. The method gives the processed image high spatial resolution combined with high dynamic resolution. The original image is made available in digital format. Contrast-increasing filtration is performed on the original digital image. The original digital image is converted into a radiometric pseudocolor image based on a chosen color range in which each color corresponds to an absolute measured, radiated or reflected quantity of energy within a certain wavelength band and where the images are represented in a format containing a luminance component. The filtered contrast-increased original image is scaled in terms of the luminance component in the radiometric color image. The luminance component in the radiometric color image is replaced with the scaled, filtered contrast-increased luminance component of the original image.

5 Claims, 1 Drawing Sheet

OTHER PUBLICATIONS

Silverman, J.; , "Display and enhancement of infrared images," Image Processing and its Applications, 1992., International Conference on , vol., no., pp. 345-348, Apr. 7-9, 1992.*

Toet, A: "Natural colour mapping for multiband nightvision imagery", Information Fusion, Sep. 2003, Elsevier, USA, vol. 4, nr. 3, p. 155-166.

Durand, F et al: "Fast bilateral filtering for the display of high-dynamic-range images", SIGGRAPH '02: 29th International Conference on Computer Graphics and Interactive Techniques, Jul. 21-26, 2002, San Antonio, TX, USA, vol. 6, nr. 4, p. 257-266.

Pei, J: "A method for IR point target detection based on spatial-temporal bilateral filter", 18th International Conference on Pattern Recognition, ICPR 2006; Hong Kong, China, Aug. 20-24, 2006, vol. 3, p. 846-849.

Tomasi, C et al: "Bilateral Filtering for Gray and Color Images", Proceedings of the 1988 IEEE International Conference on Computer Vision, Bombay, India.

International search report, Jun. 30, 2008.

Written opinion of the international searching authority, Jun. 30, 2008.

Extended European Search Report, dated May 21, 2012, issued by the European Patent Office in connection with counterpart European Patent Application No. 08705252.8.

Chance, B.A., "Synthetic imagery to simulate camouflage effectiveness," pp. 2098-2102, May 22, 1989.

Ling et al., "FFT-enhanced IHS transform method for fusing high-resolution satellite images," *ISPRS Journal of Photogrammetry and Remote Sensing*, vol. 61, No. 6, pp. 381-392, Jan. 20, 2007.

Armenakis, C., et al., "A Comparative Analysis of Image Fusion Methods," *IEEE Transactions on Geoscience and Remote Sensing*, vol. 43, No. 6, Jun. 1, 2005.

* cited by examiner

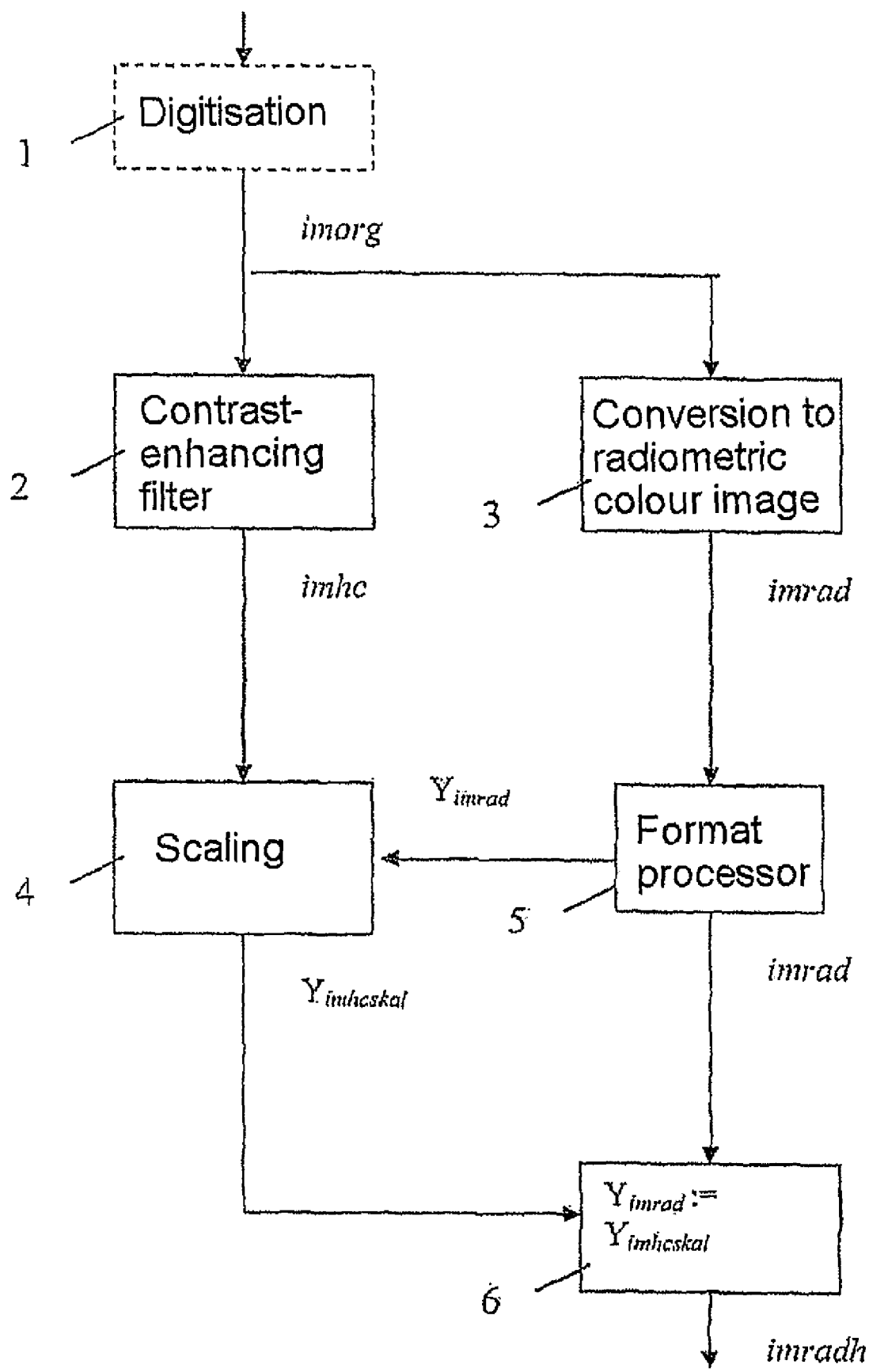

METHOD FOR ENHANCING CONTRAST IN INFRARED IMAGES

CROSS-REFERENCE TO RELATED APPLICATIONS

This application claims priority to Swedish patent application 0700240-5 filed 1 Feb. 2007 and is the national phase under 35 U.S.C. §371 of PCT/SE2008/000082filed 30 Jan. 2008.

FIELD OF THE INVENTION

The present invention relates to a method for image processing comprising the filtering and conversion to a radiometric colour image based on an original image.

BACKGROUND OF THE INVENTION

Systems which generate images, be they IR, MR, radar or x-ray, have two different requirements. The one requirement can be seen as spatial resolution and the other dynamic resolution. The requirement for spatial resolution comes from the need to resolve small objects and the dynamic resolution from the need to be able to resolve and measure signal levels on an image surface. For example, with radar, small objects such as aeroplanes may need to be detected and, with another, weather radar, the density of a cloud may need to be established to determine whether or not it is a rain cloud. In the healthcare sector, personnel may want to look at fractures in a leg or tissue change in an organ. The one need concerns looking at a large signal difference in a small area, and the other concerns looking at a small signal difference in a large area or the absolute signal. There are many examples and, in most cases, active sensor systems can meet these needs by adapting the energy in the emitted radiation. In passive systems, however, the emitted radiation can, of course, not be controlled since that is what needs to be measured.

In the area of IR image transmission, which is called thermography or radiometry, the focus is on dynamic resolution, i.e. being able to determine the temperature of a surface. When IR is used instead of or in addition to other image generating systems, e.g. for monitoring, reconnaissance or in military applications, the focus is on spatial resolution without consideration of absolute levels. This means that one often works with different intelligent image processing solutions to increase the spatial contrast. For example, classic histogram equalisation can be applied. Other well-known methods for increasing the contrast in an image include Retinex, Unsharp Mask, AHE (Adaptive Histogram Equalisation), CLAHE (Contrast Limited Adaptive Histogram Equalisation) and other types of frequency-based high-pass filters. The disadvantage of these and other known methods in an IR context is that the information concerning the absolute signal level or temperature of an object in the scene is no longer preserved.

There are many instances of when a good image needs to have good contrast and produce radiometric information, for example, during search and rescue (SAR) operations, when one wants to be able to establish a small object at a long distance, such as someone who has fallen overboard into the sea or a walker lost in the mountains. In these examples a check also needs to be made of the temperature to avoid pursuing a buoy, a reflection, stone or suchlike. In these cases, so-called isotherms are sometimes taken. An equivalent situation exists in thermography when one wants to add spatial resolution to a radiometric image. A small change in a large area can therefore be localised and the exact position, for example, of a fracture in a pipe identified. Therefore, it is an advantage if the operator can also differentiate details and also determine the object's absolute temperature. Until now, the requirements for high spatial resolution combined with high dynamic resolution and preserved radiometric information have been inconsistent.

SUMMARY OF THE INVENTION

The purpose of the invention is to produce a method which gives an image which displays high spatial resolution combined with high dynamic resolution and radiometric information.

The purpose of the invention is achieved using a method based on the first paragraph and characterised by the following steps:
a. making the original image available in digital format.
b. contrast-increasing filtration of the original digital image.
c. conversion of the original digital image into a radiometric colour image based on a chosen colour range in which each colour corresponds to an absolute signal level which, in turn, corresponds to a certain radiated or reflected energy in the wavelength band used and where the images are represented in a format containing a luminance component.
d. scaling of the filtered contrast-increased original image in terms of the luminance component in the radiometric colour image.
e. replacement of the luminance component in the radiometric colour image with the scaled, filtered contrast-increased original image's luminance component.

The method for which a patent is sought comprises an IR-applied method through which radiated or reflected energy/heat is visualised with a colour scale and where each colour, given known or assumed physical values for transmission, reflection and atmospheric damping in the measured wavelength range, corresponds to an absolute temperature in the scene. The method also involves a filtering method through which the image is filtered to increase the contrast so that details become easier to differentiate. An absolute temperature cannot, however, be read based simply on the latter method. The patent-pending method therefore combines these two methods and produces a high-contrast image from which an absolute temperature can also be read. The image is given a new dimension, which enables more information to be read than could be previously.

The synthetically radiated pseudocolour image can be advantageously represented in the format YCbCr, where Y corresponds to the luminance and Cb and Cr correspond to chrome colour differences. Since the Cr and Cb components in the colour image are the same as in the original radiometric image, through our patent-pending method, the colour components will be the same, but the luminance will have considerably more contrast. This means that we still have radiometric information in the rough colour scale. An object coloured red is warmer than an object coloured blue (if we use a standard colour range for IR) and given the assumptions made about the physical properties of heat radiation in the illustrated scene, we can also deduce the absolute temperature the colour in question corresponds to. Local variations in a colour have, however, been given a higher contrast, which gives a clearer image with more detail.

Based on a successful execution of the method, the contrast-increasing filtration is performed according to a method called bilateral filtration, see for example the article "Bilateral Filtering for Gray and Color Images" by Tomasi C and Manduchi R, Proceedings of the 1988 IEEE International Conference on Computer Vision, Bombay, India. The method increases, the spatial contrast in a favourable way and has been applied successfully to IR images in the past.

A number of other known methods for contrast-increasing filtration are possible and the contrast-increasing filtration can, for example, take place in the frequency dimension (Fourier transform) by eliminating or lowering the amplitude of the low frequency components. In a similar manner, the local contrast can be increased by applying a filter to an image transformed according to a Wavelet method.

BRIEF DESCRIPTION OF THE DRAWINGS

The invention will be described below in more detail with reference to the appended drawing which, in a schematic flow format, illustrates the method according to the invention step by step.

DETAILED DESCRIPTION OF EMBODIMENTS OF THE INVENTION

For image processing, we use as a starting point an original image which, if not already in digital format, is digitalised in block 1, illustrated by dashed lines. The original image in digital format is called imorg. The digital original image is filtered to increase the image's contrast. This takes place in a block 2. The filtration can be performed according to the article referred to above or other appropriate contrast-increasing method. The filtered image is called imhc (high contrast) and has a high contrast but lacks a direct connection between the signal level and the energy measured from the scene.

In parallel with the filtration of the original image, the digital original image is converted into a synthetic, radiometric, pseudocolour image. This happens in a block 3 and the radiometric colour image is called imrad. The conversion takes place based on a chosen colour range so that, given known or assumed physical criteria for the relevant wavelength band, each colour corresponds to an absolute temperature. An appropriate suggested image format is the known YCrCb format. Y thus corresponds to the luminance and Cb and Cr to chrome colour differences.

In a block 4 the image is scaled with increased contrast imhc in the same manner as the pseudocolour image so that it is given the same span (min. and max. values) as the luminance component $Y_{imrad}$ in the radiometric colour image imrad. A block 5 provides the radiometric colour image's imrad luminance component $Y_{imrad}$ for this scaling.

In a subsequent step, represented by block 6, the luminance component $Y_{imrad}$ in the radiometric colour image imrad has been replaced with the luminance component $Y_{imhcskal}$ for the scaled, filtered, contrast-increased original image and an image imradhc with high local contrast and, therefore, high spatial resolution combined with reference (via the colour component) to the absolute scene temperature within the whole temperature range, and, therefore, high dynamic resolution has been obtained.

Since the Cr and Cb components in the final image imradhc are the same as in the original radiometric image imrad, the colours, apart from their luminance component, will be the same, but the luminance $Y_{imhcskal}$ will have significantly more local contrast. This means that we still have radiometric information in the rough colour scale. An object coloured red is warmer than an object coloured blue if, in the pseudocolour image, we use a range where red is warmer than blue and we can also, given the physical criteria, specify the absolute temperature the colour corresponds to. Local variations in a colour have, however, been given a higher contrast, resulting in a clearer image with more detail.

The invention is not limited to the design described as examples above, but can be subjected to modifications within the framework of the following patent claims. For example, other contrast-increasing filtration methods can be used. Furthermore, image formats other than the YCrCb format can be used.

The invention claimed is:

1. A method for image processing comprising filtration and conversion into a radiometric color image based on an original image, the method comprising:
    making the original image available in digital, format;
    contrast-increasing filtration of the original digital image;
    converting the original digital image into a radiometric pseudocolor image based on a chosen color range in which each color corresponds to an absolute measured, radiated or reflected quantity of energy within a certain wavelength band and where the images are represented in a format containing a luminance component;
    scaling of the filtered contrast-increased original image in terms of the luminance component in the radiometric color image; and
    replacing the luminance component in the radiometric color image with the scaled, filtered contrast-increased luminance component of the original image.

2. The method according to claim 1, wherein the converted color image is represented in the format YCbCr, where Y corresponds to the luminance and Cb and Cr correspond to chrome color differences.

3. The method according to claim 1, wherein the contrast-increasing filtration is performed using bilateral filtration.

4. The method according to claim 1, wherein the contrast-increasing filtration is performed in a frequency dimension.

5. The method according to claim 1, wherein local contrasts are increased by applying a filter to an image transformed according to a Wavelet method.

* * * * *